UNITED STATES PATENT OFFICE

CYRUS M. WARREN, OF BROOKLINE, MASSACHUSETTS.

IMPROVEMENT IN CONCRETE PAVEMENTS.

Specification forming part of Letters Patent No. 179,831, dated July 11, 1876; Reissue No. 8,982, dated November 25, 1879; application filed February 20, 1878.

*To all whom it may concern:*

Be it known that I, CYRUS M. WARREN, of Brookline, in the county of Norfolk and State of Massachusetts, have invented a new and Improved Concrete Pavement, which invention is fully set forth in the following specification.

This invention is a pavement composed of a foundation layer of concrete, of which coal-tar or coal-tar pitch is an ingredient, and an upper or protecting layer of a non-volatile substance, such as natural bitumen or asphaltum, which, if necessary, may be mixed with or softened by the addition of the tarry residuum or heavy oil of petroleum or candle-tar; or, instead of using natural bitumen or asphaltum for the protecting layer, a mastic of bitumen, asphaltum, or rosin, softened, if required, with petroleum residuum or equivalent material, and sand, ashes, broken stone, or equivalent materials, may be employed.

Concrete, composed principally of coal-tar or coal-tar pitch and sand, broken stone, or equivalent material, has been used for a long time as a pavement, and the utilization of such concrete is very desirable on account of its low cost. Pavements made from such concrete alone, however, soon deteriorate. The volatile matters largely mixed with or contained in coal-tar or coal-tar pitch evaporate by the influence of the atmosphere, so that the concrete becomes brittle, and in the course of time the pavement is full of cracks and holes.

This difficulty I have obviated by applying to a pavement made as above stated, of coal-tar or coal-tar pitch and sand, broken stone, or equivalent material, a non-volatile protecting layer, which may be made of natural bitumen, or asphaltum of proper consistency, where such can be had at a reasonable cost; or, in localities where natural bitumen or asphaltum of the proper consistency is not found or not obtainable at a reasonable price, I substitute therefor an imitation of natural bitumen or asphaltum, which is produced by mixing bitumen or asphaltum or rosin suitably tempered, as may be required, with petroleum residuum, or equivalent material, together with sand, ashes, broken stone, or equivalent materials.

Natural bitumen frequently appears in massive deposits composed of lime, sand, or other earthy matters mixed with a larger or smaller percentage of bitumen or asphaltum. Some of these are bituminous rocks, which can be disintegrated and prepared for the non-volatile protecting layer of my pavement without the addition of any other material; but in other instances the bituminous masses, as found in nature, are too hard for the non-volatile protecting-layer of my pavement, and in that case it is necessary to soften the same by the addition of a softer bitumen or asphaltum, or heavy oil of petroleum, or candle-tar, or other equivalent non-volatile material or mixture of non-volatile materials.

In localities, however, where a suitable natural bitumen or bituminous rock is not found, or where it cannot be obtained at a sufficiently low price for my purpose, I prepare an imitation thereof by mixing together, in suitable proportions, asphaltum and heavy oil or residuum of petroleum or candle-tar, or a mixture of two or more of these or equivalent non-volatile material, with sand, ashes, broken stones, or equivalent material, whereby a mastic is obtained which can be spread on the foundation layer of coal-tar or coal-tar pitch and sand, ashes, broken stone, or other equivalent material, and which, when spread on this foundation layer, forms a durable wearing-surface, and otherwise protects the same by preventing the volatile matters contained in the coal-tar or coal-tar pitch from evaporating.

A pavement can thus be produced which is equal in durability to a pavement composed entirely of natural bitumen, and is considerably cheaper.

I am aware that an asphaltic pavement has been in use prior to my invention which combined in its structure a base composed of stones mixed with and laid in bitumen and then rolled, there being placed upon such a layer of stones coated with bitumen and asphalt, which was likewise rolled, and upon such layer was placed gravel or broken stone, and it, in turn, protected by a covering composed of carbonate of lime or water-cement, which was subjected to pressure.

Further, I am aware that a pavement has been made in which bitumen, paraffine, and a calcareous rock-lime or carbonate of lime are mixed together, and in a heated state laid upon a foundation made of broken stones or of cement evenly rolled, and as neither of said structures combines a foundation made of concrete containing coal-tar or coal-tar pitch, which is covered and protected by a non-volatile layer of mastic bituminous rock, as is present in my invention, the same are hereby disclaimed.

What I claim as new, and desire to secure by Letters Patent, is—

A pavement composed of a foundation of concrete containing coal-tar or coal-tar pitch and a non-volatile protecting wearing or surface layer composed of a mastic of bituminous rock or an equivalent non-volatile compound, substantially as set forth.

CYRUS M. WARREN.

Witnesses:
D. WALLIS MORRISON,
FRED. L. KANE.